United States Patent [19]

Lieb

[11] 3,924,460
[45] Dec. 9, 1975

[54] MEASURING FRAME FOR A VEHICLE FOR CONTROLLING THE GEOMETRICAL CHARACTERISTICS OF RAILWAY TRACK

[76] Inventor: M. Johann Lieb, 15, Avenue De La Vallonnette, CH - 1012 Lausanne, Vaud, Switzerland

[22] Filed: July 11, 1974

[21] Appl. No.: 487,632

[30] Foreign Application Priority Data
July 16, 1973 Switzerland.................... 10356/73

[52] U.S. Cl. .............................................. 73/146
[51] Int. Cl............................................... B61k 9/12
[58] Field of Search ................ 73/146; 33/144, 146

[56] References Cited
UNITED STATES PATENTS
938,993   12/1909   Ellis et al. .............................. 33/144

Primary Examiner—Donald O. Woodiel
Attorney, Agent, or Firm—Wenderoth, Lind and Ponack

[57] ABSTRACT

Measuring frame for a control vehicle for the geometrical characteristics of railway tracks supported on two axles of a bogie of said vehicle and having guidance members for sensors of the rails intended to sense the position of the rails in the plane of the track. The frame is characterized in that it is of a rigid and undeformable construction, whereby its connection with the two axles of the bogie is realized on the one hand at two points on two spaced bearings mounted on a first axle between the wheels and on the other at a third point on a third bearing mounted on a second axle also between the two wheels, in that the fixing of the frame to the bearings is not rigid over at least one of the three bearings and permits a clearance of the fixing point of the frame within predetermined limits in a plane parallel to the plane of the track by means of, for example, a slide fixed to the bearing, and finally in that the fixing of the frame at its third point on the third bearing of the second axle comprises a ball and socket joint.

3 Claims, 4 Drawing Figures

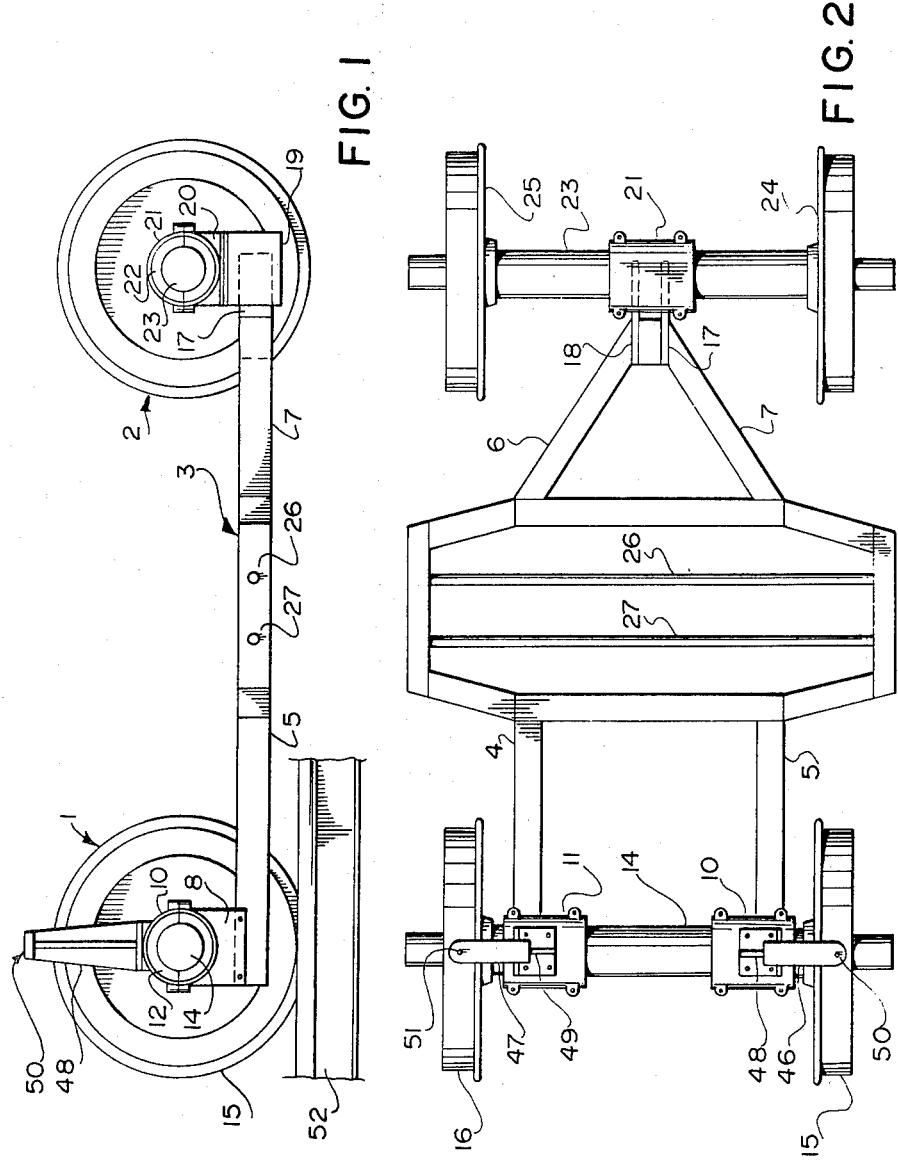

MEASURING FRAME FOR A VEHICLE FOR CONTROLLING THE GEOMETRICAL CHARACTERISTICS OF RAILWAY TRACK

BACKGROUND OF THE INVENTION

The present invention relates to a measuring frame for a vehicle for controlling the geometrical characteristics of railway tracks supported on the two axles of a bogie of said vehicle and having rail sensor guidance devices for sensing the position of the rails in the plane of the track.

Such measuring frames are already known. They are generally fixed at four points to the four axle boxes of the two axles of a bogie.

Being fixed in this way a measuring frame is forced to follow the two axles in their relative movements in the vertical plane and therefore undergoes alternate torsional stresses. It is therefore necessary to have a relatively flexible construction for such a measuring frame so that it will not deteriorate under deformation. It is obvious that because of the effect of fatigue, such frames have a relatively short life. Moreover this necessary flexibility is prejudicial to the precision of the measurements performed because the rail sensors cannot be adjusted in a very precise manner on the guidance means without the risk of jamming.

However, this relatively simple construction of a flexible measuring frame fixed to the axle boxes has given satisfaction when the speeds of use imposed on the control vehicles permitted the use of bogies whereon the two axles were mounted in rigided axle boxes substantially without any play. With the increasing speed of use imposed, it has become necessary to give the axles a certain lateral and longitudinal clearance relative to the bogie chassis. To this end the presently used bogie axles are mounted on axle boxes with a ball and socket joint and this more flexible mounting obviously causes additional problems both in the design of the frame itself and in the precision of the measurements performed. In fact the space which necessarily exists on such axle boxes with a ball and socket joint between their pivot point and their point of fixing to the frame means that in addition to causing new torsional stresses at the points of fixing to the frame, variations in height can be caused between the plane of the measuring frame and the plane of the track on each oscillation of the axle boxes in the vertical plane containing the axis of the axle. These height variations cause measuring errors in the plane of the track and in the perpendicular plane thereto. This takes place in the plane of the track due to the inclination generally given to the contact face of the sensors which means that any heightwise displacement thereof is accompanied by a displacement in the plane of the track relative to the reference face of the rail head and in the plane perpendicular to the track plane when the frame is itself used as the measuring platform. To these disadvantages must be added the errors caused by vibrations of the measuring frame due to its flexibility and the jarring to which it is subjected at high speed.

However, these measuring frames are the ones which are most frequently used at present because no more favourable solution has been proposed.

The object of the present invention is to provide a measuring frame whose construction avoids or substantially reduces the above-indicated disadvantages.

SUMMARY OF THE INVENTION

To this end the measuring frame according to the invention is characterised in being of rigid and nondeformable construction, its connection with the two bogie axles is effected on the one hand at two points on two spaced bearings mounted on a first bogie axle between the two wheels thereof and on the other at a third point on a third bearing mounted on a second bogie axle also between the two wheels thereof, and in that the fixing of the frame to these bearings is not rigid over at least one of the three bearings and permits, in a plane parallel to the plane of the track and by means, for example, of a slide fixed to the bearing, a clearance of the fixing point of the frame within a predetermined limit and finally in that the fixing of the frame at its third point to the third bearing of the second axle comprises a ball and socket joint.

Being thus connected to two bogie axles the measuring frame according to the invention is not influenced by the deformations of the plane of the track and also being thus freed from any connection with axle boxes with a ball and socket joint its heightwise position relative to the track plane is invariable. Finally due to the possibility of a rigid construction due to the three point connecting system optimum adjustment is possible between the rail sensors and their guidance means.

As a result of these novel effects the measuring frame according to the invention acquires, relative to the known frames, an increased life by substantially eliminating fatigue due to torsional stresses. It is in particular advantageous to rigidly mount on the bearings of the measuring frame a measuring base for the detection of the position of the rails in the plane perpendicular to the track. In this case the ideal position of each of the reference members for the position of the rail is located perpendicular to the contact point of each wheel with the rail, above said wheel.

Without departing from the scope of the invention several embodiments are possible depending on whether the members permitting the relative movement of the two axles ball and socket joints and slides are separated on different bearings or whether said members are grouped on a single bearing.

Although all these embodiments permit the obtention of the same effects the embodiment where the ball and socket joint and slide are grouped on a single bearing is preferred because it is the most simple and economic.

BRIEF DESCRIPTION OF DRAWINGS

The accompanying drawings and description illustrate and describe a construction of the measuring frame according to the preferred embodiment of the invention but solely by way of example.

FIGS. 1, 2 and 3 are respectively a side view, a plan view and a front view of the measuring frame.

DESCRIPTION OF PREFERRED EMBODIMENTS

Figure 3:
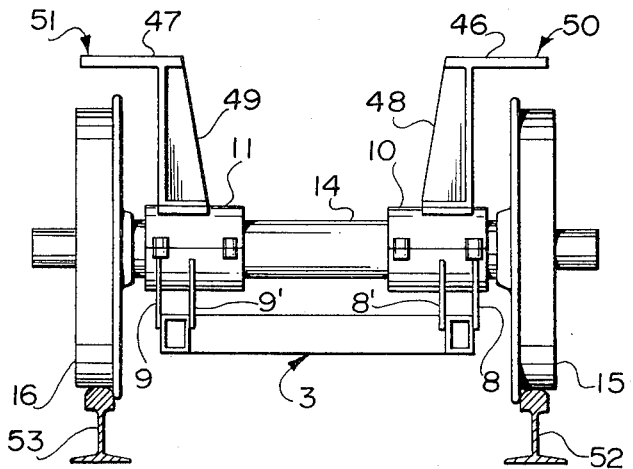

Referring now to the drawings, axles 1 and 2 support a measuring frame 3.

Measuring frame 3 comprises welded sections of rectangular cross-section extended by two parallel arms 4 and 5 on the side of axle 1 and two similar arms 6 and 7 on the side of axle 2.

The ends of the two parallel arms 4 and 5 are rigidly fixed by means of bolts to suspensions 8, 8' or 9,9' welded to two bearing support tubes 10 and 11 carrying bearings 12. These two bearings 12 whereof only one is visible in FIG. 1 are set, in two parts for disassembly on two zones machined especially for this purpose on shaft 14 of the first axle 1, as near as possible to wheels 15 and 16 of said axle and between said wheels. This assembly on bearing support tubes 10 and 11 is clearly visible in FIG. 3.

The point at which arms 6 and 7 meet is extended by two parallel fingers 17 and 18 which are supported in a joint which will be described in greater detail hereinafter with reference to FIG. 4. This joint is contained in a casing 19 which is rigidly fixed with the aid of bolts to two suspensions 20 and 20' welded to a third bearing support tube 21 having a bearing 22. This bearing 22 is set, also in two parts, for disassembly purposes on a zone especially machined for this purpose of shaft 23 of axle 2 between the two wheels 24 and 25.

In the centre of this measuring frame are shown the guidance members of the sensors of the rails which serve to sense the position of the rails in the plane of the track. In this case the guidance members are two parallel tubes 26 and 27 whereon the sensors slide.

These sensors which are not within the scope of the invention are not shown so as not unnecessarily to overload the description and drawings. They can be of any known type suitable for pressing against the insides of the rail heads of the two lines of the railway track.

Figure 4:
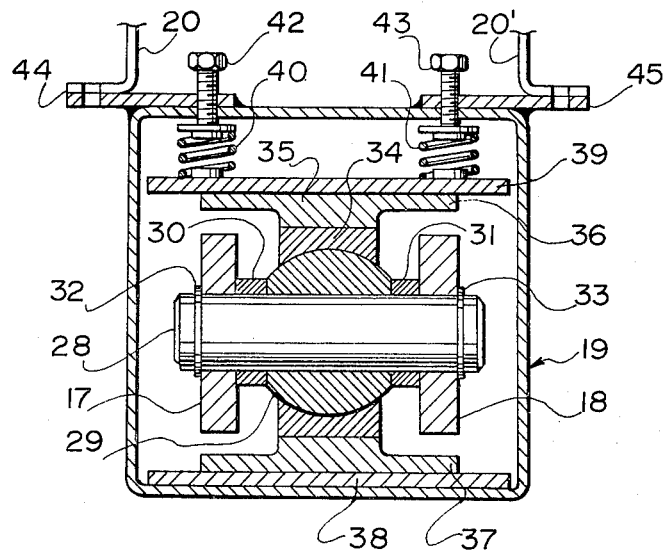
FIG. 4 is a frontal section of the articulation of the measuring frame on a third bearing showing the details of the assembly using a ball and socket joint and slide.

In FIG. 4 in frontal section can be seen of housing 19 which is here a rectangular tube section, the two fingers 17 and 18 of the measuring frame are supported on spindle 28 of a ball and socket joint 29 and kept at a certain operative spacing by two spacers 30 and 31. Spindle 28 is held in place by two circlips 32 and 33.

Ball and socket joint 29 rotates freely in a bearing 34 force fitted in a slide 35 whereof in section are shown the two parallel slide bases 36 and 37. These two slide bases 36, 37 rest on the slide faces of a slide which is in two parts whereof one 38 is fixed to the base of housing 19 and the other 39 is pressed against the slide by means of a spring system 40, 41 whose force is regulatable by means of screws 42, 43 whereof there are a sufficient number to ensure a substantially uniform pressure over the complete supporting surface of the bases of the slide.

A certain play is provided in the vertical direction between the bases 36 and 37 of the slide and fingers 17 and 18 of the frame so as to permit the free clearance of the ball and socket joint and in the transverse direction between the slide - ball and socket joint assembly and the vertical walls of the housing 19 to permit an adequate lateral clearance of the this third connection point for the measuring frame and also in the longitudinal direction of the track between the length of the slide and the limits of the slide.

These tolerances are defined on the basis of variations in the position of one axle relative to the other within the normal limits of use.

Two flanges 44 and 45 are welded to the upper part of housing 19 to permit its fixing by means of bolts to suspensions 20 and 20' of the bearing support tube 21 (FIGS. 1 and 2). Finally, this bearing support tube 21 must be immobilised in an angular position such that the slide plane of the slide always remains substantially parallel to the running plane of the track. The means used for this immobilisation is not shown because it is necessarily supported on the bogie chassis which is not shown in the drawing and said means can be of any appropriate type within the designing capacity of one skilled in the art. For example it can comprise a toggle lever connected rigidly to the bearing support tube and also when articulated via an articulated rod to a fixed part of the bogie chassis.

FIGS. 1, 2 and 3 also show reference members 46 and 47 for the height position of the rails. These reference members are rigidly fixed by means of supports 48 and 49 to the two bearing support tubes 10 and 11 in a position such that the reference points 50 and 51 serving as references for measurement are precisely located above each wheel 16 and 17 along lines extending from the points of contact of the two wheels 15 and 16 with the rails 52 and 53 of the track through the axle of the wheels.

It is obvious that this construction of the measuring frame according to the invention is solely given as an example and any variants can be made thereto by one skilled in the art without departing from the scope of the invention.

What I claim as my invention is:

1. A measuring frame, for a control vehicle for the geometrical characteristics of railway tracks, supported on two axles of a bogie of said vehicle and having guidance members for sensors of the rails intended to sense the position of the rails in the plane of the track, characterized in that the frame is of a rigid construction, and is connected at two points on two spaced bearings mounted on a first of the axles between the wheels thereof and on a third bearing mounted on a second of the axles between the two wheels thereof; in that the fixing of the frame to the bearings is not rigid over at least one of the three bearings and permits a clearance of the fixing point of the frame within predetermined limits in a plane parallel to the plane of the track in that the fixing of the frame at its third bearing on the second axle comprises a ball and socket joint.

2. A measuring frame according to claim 1, comprising a measuring base for sensing the position of the rails in a plane perpendicular to that of the track, characterized in that this base is rigidly fixed to the bearings of the measuring frame and in that the reference members for the position of the rails are located above each wheel along a line extending from the point of contact of the wheel with the rail through the axle of the wheel.

3. A measuring frame according to claim 1, characterized in that it is fixed rigidly to said two bearings mounted on said first axle and the ball and socket joint of the third bearing mounted on the second axle, is mounted, without play, in a slide locked between the two slide faces of a slide whereof the sliding plane is parallel to the running plane of the track.

* * * * *